United States Patent Office 3,732,244
Patented May 8, 1973

3,732,244
1,3-DIOXY - 2-SUBSTITUTED-4,4,5,5-TETRAHYDRO-CARBON SUBSTITUTED - $\Delta^2$ - DIHYDRO- AND IMIDAZOLINES
David G. B. Boocock, Scarborough, Ontario, Canada, and Edwin F. Ullman, Atherton, Calif., assignors to Syva Corporation, Palo Alto, Calif.
No Drawing. Continuation-in-part of application Ser. No. 724,591, Apr. 26, 1968. This application Mar. 22, 1971, Ser. No. 126,985
Int. Cl. C07d 49/34
U.S. Cl. 260—309.6                                    13 Claims

ABSTRACT OF THE DISCLOSURE $\Delta^2$-dihydro- and imidazoline having disubstitution in both the 4 and 5 positions of the ring, wherein both the nitrogen atoms in the ring are bonded to oxygen. Substituted at the two position are halogen, oxy and oxo groups. Preferred compounds have a nitroxide functionality in conjugation with a nitronyl functionality.

CROSS REFERENCES TO RELATED APPLICATIONS

This application is a continuation in part of application Ser. No. 724,591, filed Apr. 26, 1968, now abandoned. See also application Ser. No. 696,718, filed Jan. 10, 1968, now abandoned.

BACKGROUND OF THE INVENTION

Field of the invention

Stable free radicals have found a wide variety of uses. Common stable free radicals such as galvinoxyl, diphenylpicrylhydraxyl and verdazyls have been used in a variety of ways. These compounds have found use for detection of the presence of free radical intermediates, for inhibiting free radical reactions, such as oxidation of oxygen sensitive materials and for controlling polymerization by acting as a chain interceptor.

With the advent of instrumentation which has become readily available for the measurement of electron spin resonance spectra and the development of a theoretical basis for predicting and interpreting such spectra, interest in preparing novel free radical compounds which can be used in combination with other materials for a variety of purposes has been galvanized. Because the spectrum of the free radical functionality is sensitive to the environment, the free radical functionality is an extremely sensitive probe with which to meter changes in its environment. Therefore, having a stable free radical, that is stable under the conditions of measurement, and preferably stable for long periods of time, offers opportunities for a wide variety of new uses.

DESCRIPTION OF THE PRIOR ART

An excellent discussion of nitroxide free radicals may be found in Forrester et al, Organic Chemistry of Stable Free Radicals, Academic Press, New York (1968), Chapter 5. Compounds having the same diazole ring structure are disclosed in Osiecke et al., J. Am. Chem. Soc. 90 107 (1968). See also Boocock et al., ibid, 90 6873 (1968); Kreilick et al., ibid, 91 5121 (1969); Boocock et al., ibid, 90 5945 (1968); and Ullman et al., Chem. Comm. 1969, 1161. For use of nitroxide free radicals see U.S. Pat. Nos. 3,453,288, 3,481,952, and 3,489,522, as well as an article by Hubbell et al., Proc. Nat. Acad. Sci. U.S., 61, 12 (1968) which disclose the use of nitroxide free radicals as spin labels for various naturally occurring materials. For other uses, see U.S. Pat. Nos. 3,197,508 and 3,372,182.

SUMMARY OF THE INVENTION

The subject invention concerns imidazolidines having a nitroxide free radical functionality and an oxygen or halogen substituent at the two position. Also, higher oxidation states are provided which are strong oxidizing agents and can be used as colored reagents for titrations in aqueous systems. The compounds can be readily prepared from bishydroxylamines by a variety of routes.

DESCRIPTION OF THE SPECIFIC EMBODIMENTS

The compounds of this invention are 4,4,5,5-tetrasubstituted diazolines and diazolidines having an oxygen or halogen substituent at the two position and from 0 to 1 site of olefinic unsaturation. The two nitrogen atoms are bonded to oxygen atoms and are at varying levels of oxidation. Included among the levels of oxidation are the nitroxide radical and the nitrosonium ion. Also, a radical anion is obtained when an oxy group is present at the two position and one of the nitrogen-oxygen groups is a nitroxide free radical functionality.

The subject compositions will for the most part have the following general formula:

$$\begin{array}{c} R^1 \quad A \\ | \quad \| \\ R^2-C_5-N_1 \\ | \qquad \qquad \diagdown \\ \qquad \qquad \qquad C_2=Y \\ | \qquad \qquad \diagup \\ R^3-C_4-N_3 \\ | \quad | \\ R^4 \quad B \end{array}$$

wherein

Each of $R^{1-4}$ is a hydrocarbon group of from 1 to 20 carbon atoms, usually of from 1 to 12 carbon atoms and more usually of from 1 to 8 carbon atoms, which may be aliphatically saturated or unsaturated, normally having not more than 1 site of aliphatic unsaturation and may be alkyl, alkenyl, alkinyl, alicyclic or aryl or combinations thereof; or $R^1$ and $R^2$ or $R^3$ and $R^4$ may be taken together to form a divalent radical, an alkylene or an alkenylene group, each having from about 3 to 10 carbon atoms; or $R^1$ and $R^3$ may be taken together to form a divalent radical of from 3 to 10 carbon atoms to provide a mono- or bicyclic ring with the carbon atoms to which they are attached;

Each of the atom pairs $$N_1=A, \; N_1=C_2 \text{ and } C_2=Y$$

is joined by a single or a double bond, provided that when the atom pair $$N_1=C_2$$

is joined by a single bond, $$C_2=Y$$

is joined by a double bond and when the atom pair $$N_1=C_2$$

is joined by a double bond, both $$C_2=Y \text{ and } N_1=A$$

are joined by a single bond;

And A and B are selected from the hydroxyl group and oxygen atoms while Y is selected from iodine, chlorine, bromine (and characterized as X); an oxygen atom (and characterized as 0) and a substituted oxygen atom (and characterized as —$OR_5$). When the atom pair $$C_2=Y$$

is joined by a double bond, Y is an oxygen atom (a carbonyl oxygen). $R_5$ is an organic group as defined infra.

Included in the above formula are the following individual subgenera:

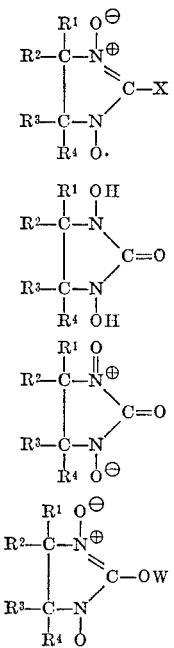

wherein $R^{1-4}$ have been defined previously, X is halogen of atomic No. 17 to 53 (chlorine, bromine and iodine) and W is a proton, a cation, e.g. metal cations such as alkali and alkaline earth metals, heavy metals, etc., ammonium cations, sulfonium cations, phosphonium, etc.; and an organic radical bonded through carbon to oxygen, the organic radical being broadly defined below, or an inorganic acid group, e.g. phosphate, sulfate, borate, etc.

The compounds of this invention will be of at least seven carbon atoms and depending on the nature of W may be as high as five million. Normally, per diazoline ring, the molecule will have a molecular weight of not greater than about 10,000, more usually not greater than about 5,000 and preferably not greater than about 2,000. In those molecules, where W is hydrogen or a cation other than ammonium, the molecule will have from about 7 to about 75 carbon atoms, preferably from about 7 to 30 carbon atoms, and particularly preferred from 7 to 20 carbon atoms.

Where W is ammonium, phosphonium or sulfonium, it will normally have from 0 to 100 carbon atoms, more usually from 0 to 60 carbon atoms, and most usually 0 to 30 carbon atoms.

When W is an organic radical, it may have from 1 to 5 million molecular weight and from 1 to about 350,000 carbon atoms, more usually from 1 to 200 carbon atoms, and most usually 1 to 100 carbon atoms. Depending on the particular molecule, W may have many thousands of heteroatoms, as in a sugar or protein polymer, but in non-polymeric materials, W will normally have from 0 to 20 heteroatoms, more usually from 0 to 10 heteroatoms, the heteroatoms being oxygen, nitrogen, sulfur, phosphorous, boron, silicon, halogen, and metals as cations, particularly the alkali and alkaline earth metal cations.

The inorganic esters derived from an inorganic acid group will have the oxygen atom bonded to phosphorous, sulfur, boron, nitrogen and silicon to form such esters as phosphates, phosphonates, sulfates, sulfonates, borates, nitrates, silicates, etc. The other valence of the central heteroatom may be satisfied by hydroxyl, hydrocarbyloxy, amino, —$O^{\ominus}M^{\oplus}$ salts, where M is a cation, etc. Usually, the acid group will have from 0 to 20 carbon atoms, and from 2 to 10 heteroatoms.

The preferred compounds of this invention will have $R^{1-4}$ of from 1 to 8 carbon atoms, preferably of from 1 to 3 carbon atoms, which may be aliphatic, alicyclic, or aromatic or combinations thereof and having from 0 to 1 site of aliphatic unsaturation, preferably aliphatically saturated. Two of $R^{1-4}$ may be taken together with the carbon atom or atoms to which they are attached to form a ring of from 5 to 7 annular members which may be spiro or fused to the diazoline ring.

The preferred compounds of this invention, which have halogen at the two position, have the following formula:

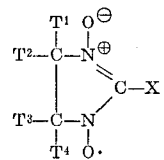

wherein $T^{1-4}$ are hydrocarbon groups of from 1 to 8 carbon atoms, preferably of from 1 to 3 carbon atoms, and may be aliphatic, alicyclic, aromatic or combinations thereof, but are preferably aliphatic having 0 to 1 site of unsaturation, preferably saturated. Two of $T^{1-4}$ may be taken together to form a divalent hydrocarbon group of from 3 to 8 carbon atoms forming a ring with the carbon atom or atoms to which they are attached, the ring having from 5 to 7 annular members. X is chlorine, bromine or iodine. The molecule will normally have at least seven carbon atoms, and usually not more than 30 carbon atoms, more usually not more than 25 carbon atoms.

The preferred compositions having a carbonyl oxygen at the two position will have the following formula:

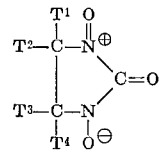

wherein $T^{1-4}$ have been defined above and the molecule has the same carbon limitations as indicated for the halogen analog.

The preferred compositions having the hydroxy or oxy (ether or esters) group at the two position will have the following formula:

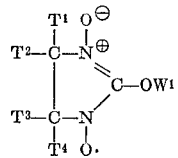

wherein $T^{1-4}$ have been defined above and $W^1$ is a metal cation, usually an alkali or alkaline earth metal cation, or an onium ion, having from 0 to 200 carbon atoms and either nitrogen, phosphorous, or sulfur as the positive center. When $W^1$ is an onium ion, it will normally be of from 0 to 200 carbon atoms, more usually from 0 to 100 carbon atoms, and preferably of from 0 to 30 carbon atoms.

The subject compositions, according to the above formula, will have at least seven carbon atoms, and at least five heteroatoms, and usually not more than about 210 carbon atoms, preferably not more than about 100 carbon atoms, and particularly preferred not more than about 50 carbon atoms. The total number of heteroatoms may be varied widely, usually not exceeding 20 heteroatoms, and more usually not exceeding about 12 heteroatoms. When the cation is a metal or ammonium, the preferred compounds will have from about 7 to 30 carbon atoms.

Finally, the preferred compounds wherein the oxygen is bonded to an organic radical through a carbon atom, will have the following formula:

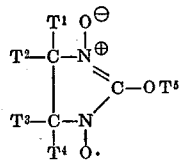

wherein $T^{1-4}$ have been defined previously and $T^5$ is an organic radical of from one to any number of carbon atoms, depending on whether it is a polymer or a simple organic molecule, usually having not more than 5 million molecular weight, more usually not more than 200,000 molecular weight, and preferably not more than 2,000 molecular weight and of at least 15 molecular weight. $T^5$ will usually have from about 1 to 100 carbon atoms, more usually from about 1 to 60 carbon atoms, and preferably 1 to 30 carbon atoms. $T^5$ may have any number of heteroatoms, particularly when it is involved in a polymer, such as a protein or sugar. However, when not involved in a polymer, $T^5$ will usually have not more than 20 heteroatoms, more usually not more than 10 heteroatoms, and preferably not more than about 6 heteroatoms.

The total number of carbon atoms in the molecule will be at least 8, and usually not more than about 200 (with the exception of polymers), more usually from 8 to 150 and preferably from 8 to about 60. For polymers, the total number of carbon atoms will usually be in the range of about 200 to 50,000.

Illustrative monovalent radicals which may be used for $R^{1-4}$ or $T^{1-4}$ include methyl, ethyl, propyl, butyl, isobutyl, hexyl, decyl, dodecyl, eicosyl, allyl, propargyl, cyclohexyl, cyclohexenyl, cycloheptyl, phenyl, naphthyl, tolyl, cumyl, benzyl, xylyl, etc. When two of $T^{1-4}$ are taken together, divalent radicals may be illustrated by trimethylene, propenylene, butylene, butenylene, cyclopentylene, cyclohexylene, and phenylbutylene.

Illustrative groups for $W^1$ include metal cations, such as lithium, sodium, potassium, caesium, magnesium, aluminum, calcium, barium, iron, nickel, cobalt, vanadium, zinc, antimony, manganese, platinum, palladium, silver and gold. Illustrative onium salts include ammonium, methylammonium, tetramethylammonium, octadecyltrimethylammonium, trimethylsulfonium, 1-methyl-1-thioniacyclohexane, tetraphenylphosphonium, tetrabutylphosphonium, etc.

As already indicated, $T^5$ may be any radical bonded through carbon to the oxygen bonded to the ring. Illustrative $T^5$ groups include methyl, butyl, dodecyl, polyethylenyl, polyisobutenyl, propargyl, cyclopentadienyl, cyclooctanyl, naphthyl, anthracenyl, phenanthryl, chlorophenyl, p-methoxyphenyl, nitrobenzyl, tert.-butylbenzyl, sucrosyl, fructosyl, amylosyl, threoninyl, acetyl, acetonyl, tryrosinyl, glutamyl, cyanoacetyl, tetrahydrofuranyl, etc. The various functionalities which may be present include oxy, amino, oxocarbonyl, nonoxocarbonyl, inorganic acids, esters and amides, nitro, cyano, halo, etc.

REACTION PROCEDURES

Basic to the preparation of the subject compositions are the availability of tetra-substituted-1,2-bishydroxyl-aminoethanes. These are readily prepared by dimerization of a disubstituted nitromethane by coupling the α-halo nitro compound with the anion of a disubstituted nitromethane. While it is most convenient to prepare tetra-substituted 1,2-dinitromethanes which are symmetrical about the ethane bond, this is not required, and dinitromethanes may be prepared with four different substituents. Alternatively, dinitroethanes may be prepared which may be coupled with an appropriate diene so as to form a cyclic or bicyclic 1,2-dinitro compound. The dinitro compound are then readily reduced to the 1,2-dihydroxylamino derivatives.

For preparation of the dinitro compounds see Siegle et al., J. Org. Chem., 5100 (1940) and Sayre, J. Am. Chem. Soc., 77, 6689 (1955).

Once the bishydroxylamine is available, the dioxydiazoles of this invention may be readily prepared.

The following flow chart indicates the various reactions which are involved.

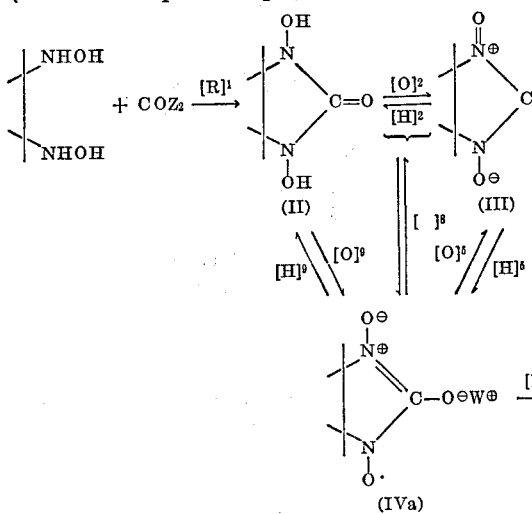
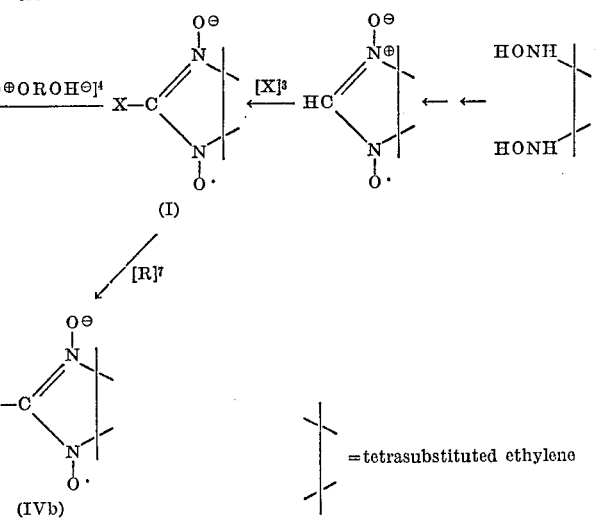

The superscripts in relationship to the symbols over the arrows in brackets indicate the particular reaction. The symbols in the brackets: [R] indicates reagents; [H] indicates a reducing reagent; [O] indicates an oxidizing reagent; [X] indicates a halogenating reagent, and [$H_3O^⊕$ or $OH^⊖$] indicates acidic or basic catalysis. Z intends any group which forms a derivative of carbonic acid which will react with the hydroxylamines to form the hydroxamic acid derivative. X and W as substituents have been defined previously, and the double arrow indicates a series of steps. The steps are disclosed in co-pending application Ser. No. 740,055, filed June 26, 1968.

Considering reaction 1, the formation of Compound II, 1,2-dihydroxy-1,3-diazoline-2-one. Z may be any replaceable group such as halogen, hydrocarbyloxy, hydrocarbylthiooxy, amino, acyloxy, etc. (Hydrocarbyl is a group compound solely of carbon and hydrogen.) Z may be illustrated by bromo, iodo, chloro, methoxy, ethoxy, propyloxy, phenoxy, methylmercapto, ethylmercapto, propylmercapto, etc. Since Z is not involved in the final product, the simplest and most convenient substituents will be used, such as halogen, lower alkoxy, and acyloxy of from 1 to 6 carbon atoms.

In carrying out the reaction, a dilute solution in an inert solvent may be conveniently used, when the reactants from from about 0.1 to 20 weight percent of the total reaction mixure. When an acidic product is formed, such as hydrohalide acid, desirably a weak base should be present such as an alkali metal bicarbonate, or carbonate or a tertiary amine. The reaction may be carried out under mild conditions, —10° to 100° C., for a time depending upon the particular reactants, the temperature and the solvent. Illustrative solvents include aromatic hydrocarbons, inert halohydrocarbons, etc.

Compound II, the 1,3-dihydroxyimidazolidine-2-one may then be oxidized (reaction 2) to the 1,3-dioxyimidazolidine-2-one, compound III. Moderately strong oxidizing agents are employed, such as lead dioxide, halogens, manganese dioxide, potassium permanganate, oxygen in an alkaline media, oxyhalides, e.g. periodate, lead tetraacetate, etc. Aqueous or organic solvents may be employed at ambient or elevated temperatures.

The compound II need not be isolated but may be oxidized directly in the inert solvent by treatment with one of the aforementioned oxidizing agents. The product may then be isolated by any convenient means.

Compound II, the 1,3-dihydroxyimidazolidine-2-one may be oxidized directly to Compound IVa, the 1,2,3-trioxyimidazolidine (reaction 9) with mild oxidants in aqueous or alcoholic solvents under mild conditions. Illustrative oxidants include oxygen, sodium periodate, lead dioxide, sodium hypobromite and quinones. Compound IVa may be reduced to Compound II using the same reducing agents for reaction 2, listed infra.

Compound III may also be prepared from the 1,3-dioxy (more properly 1-oxyl-3-oxide) - 2 - haloimidazolidine (Compound I). This compound is readily prepared from the 2-proto analog by halogenation with any convenient halogenating agent (reaction 3). Illustrative halogenating agents include hypohalites, such as sodium hypoiodite, sodium hypobromite, tert.-butylhypochlorite; chlorine, bromine and iodine, N-chloroacetamide, N-bromosuccinide, pyridinium perbromide, cyanogen bromide, cyanogen iodide, and sodium triiodide, etc. The reaction is carried out under mild conditions, usually in a temperature range of about —10° to 50° C. Polar or nonpolar solvents may be used, such as water, benzene, chloroform, alkanols, etc.

The 2-halo compound (Compound I) once formed, can be readily hydrolysed to the 1,3-dioxyimidazolidin-2-one (Compound III) (reaction 4). Both acid and basic catalysis can be employed, usually in a hydroxylic solvent, such as water, alkanols, or mixtures thereof. Strong acids and bases may be used, such as sulphuric acid, hydrochloric acid, benzenesulfonic acid, sodium hydroxide, potassium hydroxide, etc. Elevated temperatures are desirably employed, usually in the range of about 50° to 125° C. The time for the reaction will vary widely, depending upon the particular halo-substituent, the catalyst, and the temperature. The acid or basic catalyst will normally be present in from 0.01 to 6 normal, more usually from about 1 to 5 normal concentration.

The product may be isolated by neutralizing the solution and extracting with a solvent such as chloroform or other polar solvents substantially immiscible with water.

The 1,2,3-trioxyimidazoline (more accurately 1-oxyl-2,3-dioxideimidazoline (Compound IVa) is readily prepared by the reduction of Compound III (reaction 5) in alkaline solution with mild reducing agents such as hydrogen peroxide, hydrazine, hydroxylamine, ascorbic acid, metal hydrides, etc. The reductions usually are carried out in aqueous or alcoholic solvents. The temperatures may vary widely from —10° to 100° C., but ambient temperatures are usually most convenient.

1,2,3-trioxyimidazoline (Compound IVa) may be oxidized to 1,3-dioxyimidazolidin-2-one (Compound III) (reaction 5) employing substantially the same oxidants and oxidizing conditions for reaction 2.

The 1,3-dihydroxyimidazolidine-2-one (Compound II) is readily prepared by the reduction of Compound III, with conventional reducing agents (reaction 2). Illustrative reducing agents are hydrogen and catalyst, nascent metal reduction, metal hydrides, sodium thiosulfate, etc. Depending on the method of reduction, various inert solvents may be employed, both polar and non-polar. The temperature may vary widely, from —10° to 100° C. The product is water soluble and can be isolated by various ion exchange techniques, evaporation of all volatile material and separation from other inorganic matter, etc.

Reaction 8 is a disproportionation reaction whereby Compound IVa in aqueous acidic solution (pH 4) forms Compounds II and III. Conversely, when Compounds II and III are combined in aqueous alkaline solutions (pH 8), Compound IVa is formed.

Reaction 6 and 7 are displacement reactions of halogen. In reaction 6, the displacement is of an active halogen bonded to an organic residue. In reaction 7, the reaction is an alkoxide, displacing on the 2-halo-1,3-dioxy compound (Compound I). Both of these reactions are conventional reactions of an active halogen.

Illustrative alcohols which may be employed as the alkoxides for reaction 7 are indicated in the following table.

$CH_3OH$ $C_2H_5OH$ $C_6H_5CH_2OH$ $CH_3OC_6H_4CH_2OH$ $HOOCCH_2OH$

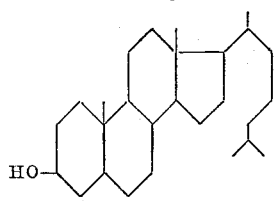

$CH_3CH_2CH_2CH=CHCH_2CH_2OH$ $CH_3CH_2CHCH_2C\equiv CH$
         |
         $OH$ $(CH_3)_2NCH_2CH_2CH_2OH$ $O_2N \cdot C_6H_4OH$ $ClCH_2CH_2CH_2OH$ $C_6H_5CHOH$
   |
   $COOCH_3$

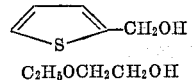

$C_2H_5OCH_2CH_2OH$ $F_3CCH_2OH$

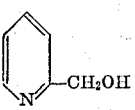

$H_2NCCH_2CH_2CH_2CH_2OH$
   ||
   $O$ $CH_3O$
     \
      $CHCH_2OH$
     /
$CH_3O$

The following examples are offered by way of illustration and not by way of limitation. (All temperatures are reported as centigrade. TMI intends 4,4,5,5-tetramethylimidazoline).

EXAMPLE A 2,3-dimethyl-2,3-dihydroxylaminobutane

A mixture of 6 N sodium hydroxide (675 ml.) and 356 g. of 2-nitropropane (4 mols) was stirred and cooled while 320 g. of bromine (2 mols) was added dropwise. Ethanol was then added and the solution refluxed gently (3 hours) before being mixed with ice water (1.5 l.). The crystalline product was then washed thoroughly with 50% ethanol: yield 289 g., M.P. 213–215° C.

A 175 g. (1 mol) portion of the above product was stirred in suspension in a solution of ammonium chloride (100 g., 1.9 moles) in 50% aqueous ethanol (2 l.) and kept below 15° C. while zinc dust (400 g., 6.2 mols) was added during 3 hours. The reaction mixture was allowed to come to room temperature and stirred overnight. After filtration, the combined filtrate and washings were acidified to pH 2 (150 ml. hydrochloric acid) and evaporated under reduced pressure to a viscous state. Anhydrous potassium carbonate (1 kg.) was stirred in while cooling, and the resulting powder extracted continuously with chloroform (2.5 l.) overnight. The chloroform extract was dried and evaporated to a viscous oil. Petroleum ether was added to promote crystallization of the product, which weighed 40 g. M.P. 162–163° C.

EXAMPLE B 1,3-dioxy-TMI 2,3-dimethyl-2,3-dihydroxylaminobutane (10 mg.) in 10 ml. of benzene was heated with 100 mg. of chloromethyl ether at reflux for 5 minutes. The resulting mixture was then heated with stirring with solid sodium carbonate, filtered, followed by water washing. After drying the organic layer, the solution was stirred with excess lead dioxide and filtered. On evaporation of the solvent, a bright red residue of 1,3-dioxy-TMI was obtained.

EXAMPLE C 1,3-dioxy-TMI

Into tetrahydrofuran is introduced 1 equivalent of 2,3-dimethyl-2,3-dihydroxylaminobutane, 1 equivalent of the ethylorthoester of formic acid and 1 equivalent of benzene sulfonic acid. The mixture is warmed on a steam bath for a time until the solution's color no longer appears to deepen. The solution is then extracted with sodium carbonate, the volatile materials removed by evaporation, and the product isolated. The product is 1,3-dioxy-TMI.

EXAMPLE 1

2-bromo-1,3-dioxy-TMI (A) 1,3-dioxy-TMI (200 mg., 1.27 mmole) and sodium bicarbonate (200 mg.) were dissolved in 80 ml. of water and 320 mg. (3 mmole) of cyanogen bromide added and the mixture stirred for 1 hour at 30° C. The reaction was followed by thin layer chromatography and when the reaction appeared to be complete, the aqueous solution was extracted with an equal volume of chloroform. After washing the chloroform extract twice with water, it was dried and filtered. The volatiles were removed in vacuo yielding 243 mg. (81%) of the desired product. The product was found to decompose between 90° and 100° C., and melted between 140–150° C.

(B) Following the same procedure, except substituting bromine for the cyanogen bromide, the same product was obtained in somewhat lower yield.

EXAMPLE 2

2-iodo-1,3-dioxy-TMI (A) To 1,3-dihydroxy-dihydro-TMI (1.0 g., 6.25 mmole) in water (400 ml.) was added lead dioxide (10 g.) and the mixture stirred for half an hour. It was then filtered through "Celite." To the filtrate, which contained the red 1,3-dioxy-TMI was added sodium bicarbonate (1.0 g.), potassium iodide (5.0 g.) and iodine (1.8 g., 0.007 mole). The mixture was stirred with slight warming and the reaction followed by thin layer chromatography. When the 1,3-dioxy-TMI radical could no longer be detected, the solution was extracted with an equal volume of chloroform. The chloroform solution was washed with a small amount of sodium thiosulphate solution and then twice with water. The solution was dried over sodium sulphate, filtered and the chloroform removed in vacuo to yield the named compound (0.9 g., 51%) M.P. (from benzene/petroleum ether) 145–146°.

(B) Essentially the same procedure was carried out using ICN in place of iodine and potassium iodide to yield the named compound.

EXAMPLE 3

2-chloro-1,3-dioxy-TMI 1,3-dihydroxy-dihydro-TMI (100 mg., .625 mmole) was added to 1.25% aqueous sodium hypochlorite solution (200 ml.) and the solution stirred vigorously for five minutes. The solution was then extracted with an equal volume of chloroform which was then dried over sodium sulphate. After filtration the chloroform was carefully evaporated under reduced pressure. When only a small amount of chloroform remained, a little ether was added and the resulting solution was chromatographic on silica gel (column 45 cm. long x 3 cm. diameter) using ether as eluent. The fraction containing the purple radical was collected and the solvent carefully removed to yield the named compound (15 mg., 12.5%) which was very unstable at room temperature. The ESR spectrum gave a typical 5-line pattern ($a_N$=7.25 g. in benzene).

EXAMPLE 4

1,3-dihydroxy-dihydro-TMI--2-one

To 2,3-dimethyl-2,3-dihydroxylaminobutane (250 mg.) suspended in benzene (50 ml.) was added an excess of ethyl chloroformate and the solution heated to boiling for 5 minutes. The solution was then extracted with aqueous sodium bicarbonate (50 ml.). The named compound was isolated by neutralization and evaporation of the aqueous solution followed by extraction of the residue.

EXAMPLE 5

1,3-dioxy-dihydro-TMI-2-one (A) A mixture of 100 mg. of 1,3-dioxy-2-iodo-TMI and 100 ml. of 4 N sulfuric acid was heated on a steam bath for 15 minutes. The solution was then extracted with an equal volume of chloroform. The chloroform extract was washed with a little water, dried over sodium sulphate, filtered and the solvent removed to yield the named compound (28 mg., 46% yield); M.P. (from ethyl/acetate) 190° (dec.); (from a suspension of petroleum ether) 198–200° (dec.).

(B) To 2,3-dimethyl-2,3-dihydroxylaminobutane (250 mg.) suspended in benzene (50 ml.) was added an excess of ethyl chloroformate and the solution heated to boiling for five minutes. The solution was then extracted with aqueous sodium bicarbonate (50 ml.). This solution was treated dropwise with bromine until the solution turned bright yellow. The solution was then extracted with chloroform (50 ml.) and the extract washed with water and dried over sodium sulphate. Filtration and evaporation left an orange residue which was chromatographed on silica gel using ether as eluent. The yellow band was collected and evaporation of the fractions gave the named product (3 mg.).

(C) 1,3-dioxy-2-iodo-TMI (40 mg.) was added to 2 N sodium hydroxide (30 ml.) and the mixture warmed and stirred for one hour. The aqueous mixture was extracted with chloroform until no more color passed into the chloroform. 4 N sulfuric acid was added dropwise and the solution periodically extracted with chloroform. At the neutralization point the aqueous solution turned orange. Excess acid was added and the solution extracted with chloroform (2× 30 ml.). The latter extract was dried (sodium sulphate), filtered and the cholroform removed to yield the named compound—5 mg. (20%).

EXAMPLE 6

1-oxyl-2,3-dioxy-TMI anion 1,3-dioxy-dihydro-TMI-2-one (3 mg.) was dissolved in water (2 ml.). A few drops of 2 N sodium hydroxide were added followed by two drops of 30% hydrogen peroxide. A dark blue solution was formed and the blue color could not be extracted into organic solvents. The electron spin resonance spectrum was consistent with the formation of the named species, $a_N=8.75$ g. (water). Evaporation of the water gave the solid dark blue salt mixed with sodium hydroxide.

EXAMPLE 7

1-oxyl-2-ethoxy-3-oxy-TMI

To 100 mg. of a compound prepared according to Example 1 in 20 ml. of ethanol was added dropwise 50 mg. of sodium ethoxide in 1.1 ml. of ethanol. After standing for 20 minutes at room temperature, the solvent was evaporated and the residue chromatographed on silica gel, a deep red radical being isolated.

EXAMPLE 8

1-oxyl-2-benzyloxy-3-oxy-TMI

To 100 mg. of a compound prepared according to Example 1, was added 20 ml. of dry dimethoxyethane containing 500 mg. of sodium benzyloxide and the mixture allowed to stand at room temperature for about 20 minutes. The volatiles were then evaporated and the product isolated as in Example 7. The resulting red radical was identified by electron spin resonance spectrum.

The subject compounds have a variety of uses based on their particular functionalities. Those compounds having the nitroxide radical are of varying degrees of stability. The halo substituted nitroxide compounds are useful for preparing the oxygen analogs which are found to have superior stability. Alternatively, the halo substituted analogs are readily displaced by a wide variety of substituents and therefore can be used for introducing the nitroxide functionality into various molecules having amino, alcohol, as well as carboxyl or other acyloxy functionalities.

Because the compounds are nitroxide radicals, they can be used as inhibitors of free radical reactions and as moderators in free radical polymerizations. An analogous compound of the subject compounds having a phenyl substituent at the two position was found to be extremely effective in inhibiting the polymerization of styrene, even at elevated temperatures in the presence of a free radical catalyst, such as benzoyl peroxide. In addition, by virtue of the unpaired electron, the nitroxide containing compounds can be used for measurement of weak magnetic fields by known techniques.

A further application of the subject compounds is as "spin labels" for attachment to biologically active molecules. As exemplified in Examples 7 and 8, the halo compounds are readily displaced by alkoxides. Therefore, naturally occurring materials such as the sugars and pectins, as well as glycerides, may be spin labeled by preparing the alkoxide of the naturally occurring material and combining it with the 2-halo compound. It is found with very large molecules, the bonding of the nitroxide functionality of the subject invention results in a spectrum which is related to immobilized spin. One can follow the rate of degradation of, for example, amylose, catalyzed by acid or any naturally occurring catalyst, by following the spectrum as it changes from an immobilized spin to a mobilized spin.

In addition, the 2-oxy anion is extremely water soluble. Therefore, small amounts of this material may be introduced into sources which are suspected of being pollutants. Since concentrations as low as $10^{-8}$ M of the subject radical can be detected, by metering the system suspected of being polluted, one can detect the source of pollution.

Finally, the compounds of Formula III, the 2-oxo-1,3-dioxy compounds, are extremely useful oxidizing agents. In the presence of strong acid, they can readily oxidize bromide and iodide to the free halogens or hydroxides to hydrogen peroxide. Therefore, they can be used in the detection of bromide and iodide ions. In addition, the reduction of the 2-oxo-1,3-dioxy compounds in the presence of acid does not give free radicals and these compounds are capable of oxidizing a variety of compounds of their radical cations. These compounds are therefore useful as oxidizing agents to permit detection of certain carcinogenic substances (such as benzpyrene) which tend to form very stable radical cations which can thereby be detected by ESR without interference from the reduced form of the oxidant.

Electron spin resonance spectrometers are readily available commercially and various means can be used to introduce samples into the electron spin resonance cavity to measure the number of unpaired electron functionalities in the solution. Because the samples may be very small, and with the volumes used, concentrations as low as $10^{-8}$ M can be detected, the subject compositions provide an extremely sensitive probe to the presence of various anions or other reducing materials which may be present in a system.

Although the foregoing invention has been described in some detail by way of illustration for purposes of clarity of understanding, it will be apparent to one skilled in this art that certain changes and modifications may be practiced within the spirit of this invention as limited only by the scope of the appended claims.

What is claimed is:

1. A imidazoline or imidazolidine of the formula:

$$\begin{array}{c} R^1 \quad A \\ | \quad \| \\ R^2-C_5-N_1 \\ \quad \quad \quad \diagdown \\ \quad \quad \quad \quad C_2=Y \\ \quad \quad \quad \diagup \\ R^3-C_4-N_3 \\ | \quad \quad | \\ R^4 \quad B \end{array}$$

wherein $R^{1-4}$ are hydrocarbon groups of from 1 to 20 carbon atoms, two of which may be taken together to form a ring with the carbon atom or atoms to which they are attached;

each of the atom pairs $$N_1=A, \quad N_1=C_2 \text{ and } C_2=Y$$

is joined by a single or a double bond, provided that when the atom pair $$N_1=C_2$$

is joined by a single bond, $$C_2=Y$$

is joined by a double bond and when the atom pair $$N_1=C_2$$

is joined by a double bond, both $$C_2=Y \text{ and } N_1=A$$

are joined by a single bond;

and A and B are selected from hydroxyl and oxygen atoms, and Y is selected from iodine, chlorine, bromine, oxy and oxo, with the proviso that when $$C_2=Y$$

is joined by a double bond, Y is oxo.

2. A compound of the formula:

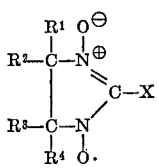

wherein $R^{1-4}$ are hydrocarbon groups of from 1 to 12 carbon atoms, wherein two of $R^{1-4}$ may be taken together to form a ring of from 5 to 7 annular members with the carbon atom or atoms to which they are attached and X is chlorine, bromine or iodine.

3. A compound according to claim 2, wherein $R^{1-4}$ are alkyl of from 1 to 8 carbon atoms.

4. A compound of the formula:

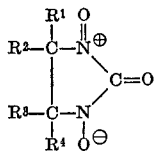

wherein $R^{1-4}$ are hydrocarbon of from 1 to 12 carbon atoms, wherein two of $R^{1-4}$ may be taken together to form a ring of from 5 to 7 annular members with the carbon atom or atoms to which they are attached.

5. A compound of the formula:

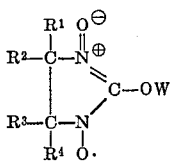

wherein $R^{1-4}$ are hydrocarbon of from 1 to 12 carbon atoms, wherein two of $R^{1-4}$ may be taken together to form a ring with the carbon atom or atoms to which they are attached and W is hydrogen, a cation, or an organic group.

6. A compound according to claim 5, wherein W is an alkali or alkaline earth metal cation.

7. A compound according to claim 5, wherein W is an inorganic acid group.

8. A compound according to claim 4 wherein said compound is of from 7 to 50 carbon atoms.

9. A compound according to claim 5, wherein $R^{1-4}$ are lower alkyl and W is a cation.

10. A compound according to claim 5, wherein $R^{1-4}$ are lower alkyl and W is benzyl.

11. A compound according to claim 5, wherein $R^{1-4}$ is lower alkyl and W is carboxymethyl.

12. A compound according to claim 4 which is 4,4,5,5-tetramethyl-1,3-dioxy-2-oxo-1,3-diazoline.

13. A compound according to claim 5 which is 1-oxyl-2,3-dioxy-4,4,5,5-tetramethylimidazolidine anion.

References Cited

FOREIGN PATENTS 997,826    7/1965    England _____ 260—309.6

OTHER REFERENCES

Osiecki et al.: J. Am. Chem. Soc., vol. 90, pp. 1078–1079 (Feb. 14, 1969).

Sayre: J. Am. Chem. Soc., vol. 77, pp. 6689 to 6690 (1955).

Volodarsky et al.: Tetrahedron Letters, No. 21, pp. 1565 to 1568 (1965).

Boocock et al.: J. Am. Chem. Soc., vol. 90, pp. 6873 to 6874 (Nov. 20, 1968).

Bergmann: The Chemistry of Acetylene and Related Compounds, p. 80 (1948) (Interscience Publishers, Inc.).

Rorzantsev: Free Nitroxyl Radicals, pp. 108 to 117, Plenum Press, New York-London (1970).

Forrester et al.: Organic Chemistry of Stable Free Radicals, p. 224, Academic Press, N.Y. (1968).

JOHN D. RANDOLPH, Primary Examiner

U.S. Cl. X.R.

23—230 B, 230 M; 252—401, 402, 403; 260—112 R, 209.5, 210 R, 296 R, 309.7